United States Patent
Nakamori et al.

(10) Patent No.: US 11,686,649 B2
(45) Date of Patent: Jun. 27, 2023

(54) EARLY SIGN DETECTION DEVICE AND EARLY SIGN DETECTION METHOD

(71) Applicant: MITSUBISHI HEAVY INDUSTRIES, LTD., Tokyo (JP)

(72) Inventors: Tomohito Nakamori, Tokyo (JP); Keisuke Matsuyama, Tokyo (JP); Yuki Mitsui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 255 days.

(21) Appl. No.: 17/145,657

(22) Filed: Jan. 11, 2021

(65) Prior Publication Data

US 2021/0223141 A1 Jul. 22, 2021

(30) Foreign Application Priority Data

Jan. 16, 2020 (JP) .............................. JP2020-005452

(51) Int. Cl.
*G01H 1/00* (2006.01)
*G01M 15/14* (2006.01)
*F02C 7/00* (2006.01)

(52) U.S. Cl.
CPC .............. *G01M 15/14* (2013.01); *F02C 7/00* (2013.01); *G01H 1/003* (2013.01); *F05D 2220/32* (2013.01); *F05D 2260/80* (2013.01)

(58) Field of Classification Search
CPC .......... G01M 15/14; F02C 7/00; G01H 1/003; F05D 2220/32; F05D 2260/80
See application file for complete search history.

(56) References Cited

U.S. PATENT DOCUMENTS

| | | | |
|---|---|---|---|
| 2014/0347043 A1* | 11/2014 | Chana | G01N 27/90 324/242 |
| 2018/0306669 A1* | 10/2018 | Mase | G01M 5/0066 |
| 2019/0033263 A1* | 1/2019 | Giurgiutiu | G01N 29/14 |
| 2019/0323996 A1* | 10/2019 | Yoskovitz | G01N 29/14 |
| 2021/0247265 A1* | 8/2021 | Winant | G01M 5/0008 |

FOREIGN PATENT DOCUMENTS

JP 2018-080621 5/2018

* cited by examiner

*Primary Examiner* — Mohamed Charioui
*Assistant Examiner* — Christine Y Liao
(74) *Attorney, Agent, or Firm* — Wenderoth, Lind & Ponack, L.L.P.

(57) ABSTRACT

An early sign detection device includes a plurality of sensors, a data acquisition unit configured to acquire time series variation data of a physical amount from each of the plurality of sensors, a computation unit configured to compute an occurrence probability of a vibration mode involved in a sudden variant vibration of a detection subject from an amplitude or a phase of the time series variation data of the physical amount at each of the plurality of positions, and a detection unit configured to detect an early sign of the sudden variant vibration on the basis of the occurrence probability of the vibration mode. The plurality of sensors are respectively disposed at a plurality of positions of the detection subject and are each configured to measure the physical amount at a corresponding position of the plurality of positions.

6 Claims, 13 Drawing Sheets

EARLY SIGN DETECTION DEVICE AND EARLY SIGN DETECTION METHOD

CROSS-REFERENCE TO RELATED APPLICATIONS

This application claims the benefit of priority to Japanese Patent Application Number 2020-005452 filed on Jan. 16, 2020. The entire contents of the above-identified application are hereby incorporated by reference.

TECHNICAL FIELD

The disclosure relates to an early sign detection device and an early sign detection method for detecting an early sign of a sudden variant vibration.

RELATED ART

In machines such as gas turbines, steam turbines, engines, boilers, aircraft, and compressors, combustion vibration, shaft vibration, and the like may occur in compressors, blades, or the like. Among these vibrations, an unstable vibration that tends to change suddenly (sudden variant vibration) reaches a limit cycle in a short time after a vibration increase occurs. Reaching the limit cycle can lead to a trip and places a heavy burden on devices.

Accordingly, avoiding such a sudden variant vibration at an early stage is desirable. However, because a vibration increase to the limit cycle happens in a short time, a sudden variant vibration may not be avoidable by control executed after detection of the vibration increase. To avoid a sudden variant vibration, it is necessary to detect an early sign well in advance of the occurrence of the sudden variant vibration.

In recent years, there have been proposed detection techniques for the purpose of detecting a sudden variant vibration in advance. For example, JP 2018-80621 A discloses a device that detects a combustion vibration using a value associated with a pressure inside a combustor of a gas turbine. This device is configured to acquire a value associated with the pressure inside the combustor of the gas turbine to analyze a network entropy and detect the occurrence of the combustion vibration when the network entropy falls below a threshold value.

SUMMARY

As a result of diligent research by the present inventors, it was found that, before a vibration detection device configured to detect a sudden variant vibration (vibration having a high risk of causing device damage) on the basis of an amplitude of a certain physical amount (for example, pressure) detects the occurrence of a sudden variant vibration, there is a vibration mode in which an occurrence probability rises. By utilizing the occurrence probability of such a vibration mode, it is possible to detect an early sign of a sudden variant vibration.

However, even when time series variation data of a physical amount (value related to the pressure inside the combustor) at one position are acquired and the network entropy is analyzed as in JP 2018-80621 A, it is difficult to find the occurrence probability of the vibration mode. Further, even when the focus is placed on the time series variation data of one physical amount, it is difficult to detect an early sign well in advance of the occurrence of the sudden variant vibration.

In light of the foregoing, an object of the disclosure is to detect a sudden variant vibration well in advance of an occurrence of the sudden variant vibration.

An early sign detection device according to the disclosure includes a plurality of sensors respectively disposed at a plurality of positions of a detection subject and each configured to measure a physical amount at a corresponding position of the plurality of positions, a data acquisition unit configured to acquire time series variation data of the physical amount from each of the plurality of sensors, a computation unit configured to compute an occurrence probability of a vibration mode involved in a sudden variant vibration of the detection subject from an amplitude or a phase of the time series variation data of the physical amount at each of the plurality of positions, and a detection unit configured to detect an early sign of the sudden variant vibration on the basis of the occurrence probability.

An early sign detection method according to the disclosure includes measuring, by each of a plurality of sensors respectively disposed at a plurality of positions of a detection subject, a physical amount at a corresponding position of the plurality of positions, acquiring time series variation data of the physical amount from each of the plurality of sensors, computing an occurrence probability of a vibration mode involved in a sudden variant vibration of the detection subject from an amplitude or a phase of the time series variation data of the physical amount at each of the plurality of positions, and detecting an early sign of the sudden variant vibration on the basis of the occurrence probability.

According to the disclosure, it is possible to detect a sudden variant vibration well in advance of an occurrence of the sudden variant vibration.

BRIEF DESCRIPTION OF DRAWINGS

The disclosure will be described with reference to the accompanying drawings, wherein like numbers reference like elements.

DESCRIPTION OF EMBODIMENTS

Embodiments will be described hereinafter with reference to the appended drawings. It is intended, however, that unless particularly specified, dimensions, materials, shapes, relative positions, and the like of components described in the embodiments shall be interpreted as illustrative only and not intended to limit the scope of the invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Early Sign Detection Device

Figure 1:
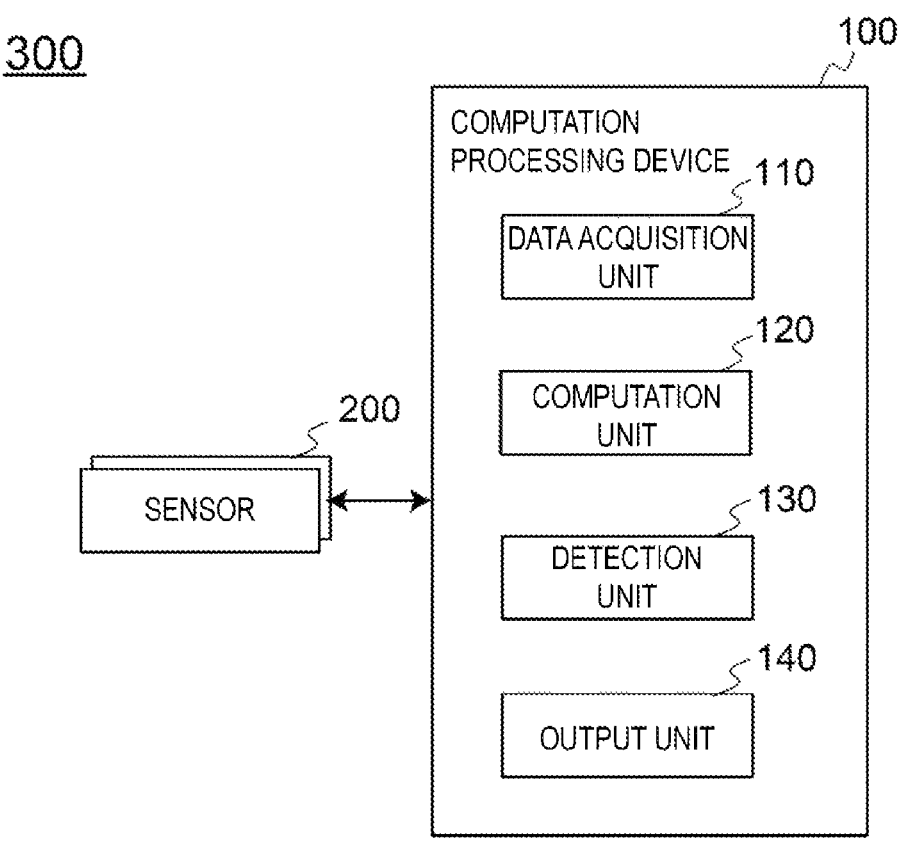
FIG. 1 is a block diagram illustrating a configuration of an early sign detection device according to an embodiment.

Hereinafter, an early sign detection device 300 according to an embodiment will be described. FIG. 1 is a block diagram illustrating a configuration of the early sign detection device 300 according to an embodiment.

As illustrated in FIG. 1, the early sign detection device 300 includes a plurality of sensors 200 and a computation processing device 100 configured to execute computation processing for detecting an early sign of a sudden variant vibration. The sensor 200 is a sensor configured to measure a physical amount of a detection subject.

The plurality of sensors 200 are respectively disposed at a plurality of positions of the detection subject, and are each configured to measure a physical amount at a corresponding position of the plurality of positions. The physical amount measured by the sensor 200 is, for example, one or more of pressure, strain, acceleration, velocity, and displacement. Note that the physical amount measured by the sensor 200 is not limited to these physical amounts. The physical amount measured by the sensor 200 need only be a physical amount highly relevant to the occurrence of a vibration mode.

The computation processing device 100 is a computer that includes, for example, a central processing unit (CPU), a random access memory (RAM), and a read only memory (ROM). In the computation processing device 100, a processor (CPU) executes a program stored in a memory (RAM or ROM) to execute the various functions described below.

Hereinafter, a functional configuration of the computation processing device 100 will be described. As illustrated in FIG. 1, the computation processing device 100 functions as a data acquisition unit 110, a computation unit 120, a detection unit 130, and an output unit 140.

The data acquisition unit 110 acquires time series variation data of the physical amount from each of the plurality of sensors 200. The time series variation data are measurement data sampled at a plurality of timings at a predetermined time (for example, 1 second) in the immediate past.

The computation unit 120 computes an occurrence probability of a vibration mode involved in a sudden variant vibration of the detection subject on the basis of the time series variation data of the physical amounts acquired by the data acquisition unit 110. Specifically, the computation unit 120 is configured to compute the occurrence probability of the vibration mode from the time series variation data of the physical amount measured at each of the plurality of positions.

Here, computation methods for the occurrence probability of the vibration mode include a computation method based on an amplitude of the time series variation data of the physical amount, and a computation method based on a phase of the time series variation data of the physical amount. In the computation process of the computation unit 120, either one of these computation methods may be employed, or a method that combines both methods may be employed. The amplitude of the time series variation data of the physical amount may be an instantaneous value of the amplitude when a function of a variable component of the temporally changing amplitude is determined and a specific time is input to the function. Note that the details of the two computation methods of the occurrence probability of the vibration mode will be described later.

The detection unit 130 is configured to detect an early sign of a sudden variant vibration on the basis of the occurrence probability of the vibration mode computed by the computation unit 120. Specifically, the detection unit 130 determines whether there is an early sign of a sudden variant vibration that should be detected on the basis of a magnitude of the occurrence probability of the vibration mode or a slope of the temporal change computed by the computation unit 120. The details of this determination method will be described later.

The output unit 140 is configured to output a predetermined signal when the detection unit 130 detects an early sign of a sudden variant vibration. The predetermined signal is a signal effective for avoiding the sudden variant vibration, such as a stop signal for stopping the operation of the detection subject, an output control signal for reducing an output of the detection subject, or a notification signal for notifying the user of an early sign of a sudden variant vibration, for example. Note that the output unit 140 may be omitted.

Arrangement Example of Detection Subject and Sensors

Figure 2:
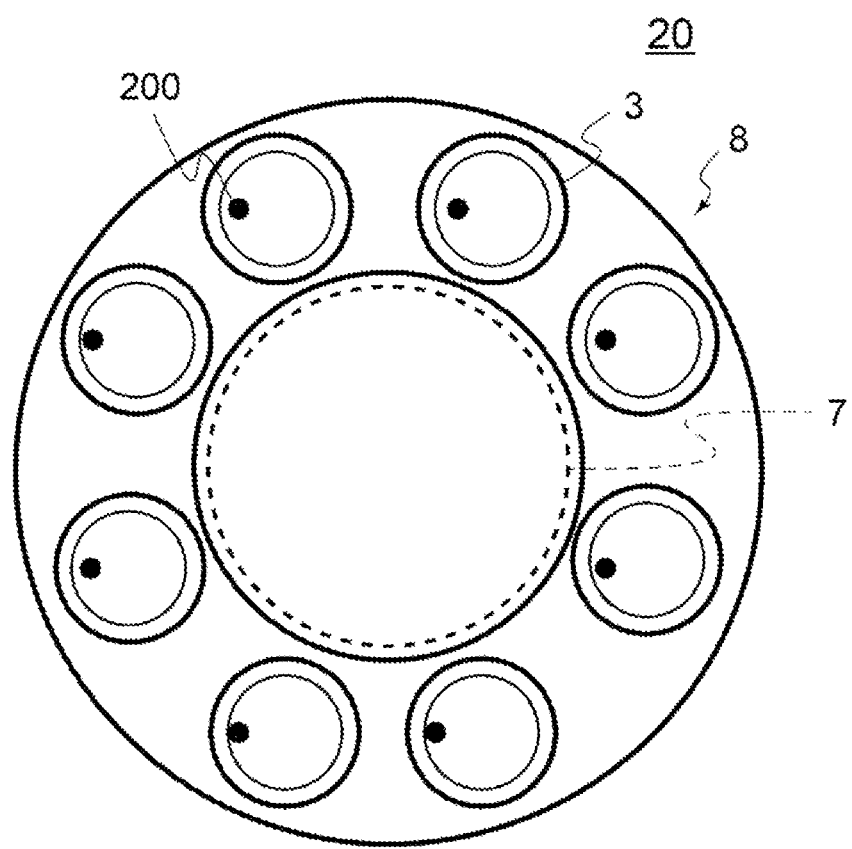
FIG. 2 is a schematic view illustrating an arrangement example of sensors of the early sign detection device according to an embodiment.
Figure 3:
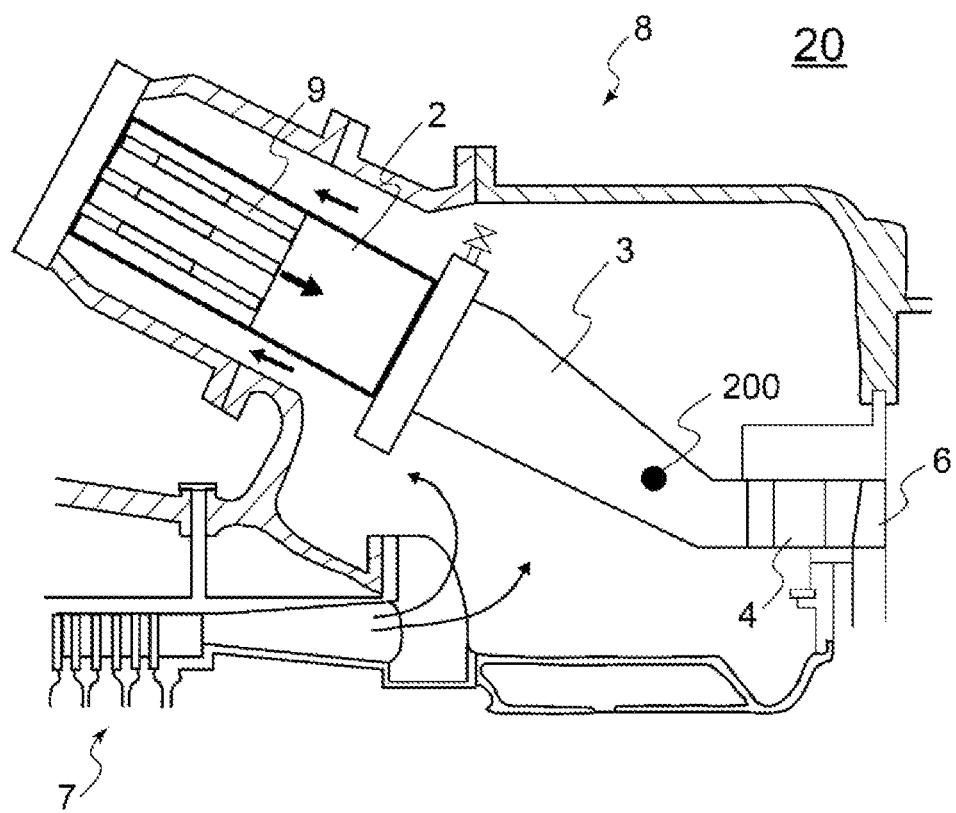
FIG. 3 is an outline cross-sectional view illustrating the arrangement example of the sensors of the early sign detection device according to an embodiment.

Hereinafter, an arrangement example of the detection subject and the sensors 200 according to an embodiment will be described. FIG. 2 is a schematic view illustrating an arrangement example of the sensors 200 of the early sign detection device 300 according to an embodiment. This drawing illustrates a cross section of a gas turbine 20 in a direction orthogonal to a turbine shaft. FIG. 3 is a schematic cross-sectional view illustrating the arrangement example of the sensors 200 of the early sign detection device 300 according to an embodiment. This drawing illustrates a cross section of the gas turbine 20 along the turbine shaft.

In an embodiment, the detection subject of the early sign detection device 300 may be, for example, the gas turbine 20 illustrated in FIG. 2 and FIG. 3. Note that the detection subject may be, for example, a machine such as a steam turbine, an engine, a boiler, an aircraft, or a compressor rather than the gas turbine 20.

As illustrated in FIG. 2 and FIG. 3, the gas turbine 20 includes a compressor 7, a combustor 8, a stator vane 4, and a rotor blade 6. As illustrated in FIG. 3, the combustor 8 includes eight can-type combustors, each provided with a fuel nozzle 9, an internal cylinder 2, and a transition piece 3. The sensor 200 is a pressure sensor for measuring a pressure inside the combustor 8. The sensor 200 is arranged in each of the eight transition pieces 3.

Note that, in this example, the sensor 200 is arranged in the transition piece 3 of the combustor 8 of the gas turbine 20. However, the arrangement of the sensor 200 is not limited to such an example. The sensor 200 need only be arranged in a position where the vibration mode can be observed and, depending on the type of detection subject, may be arranged in a compressor, a blade, a bearing, or the like.

Computation Method of Occurrence Probability of Vibration Mode Based on Amplitude Hereinafter, the computation method for computing the occurrence probability of the vibration mode on the basis of an amplitude indicated by the time series variation data of the physical amounts will be described. The computation unit 120 determines whether the vibration mode is occurring on the basis of the amplitudes of the physical amounts of the plurality of positions, the amplitudes being of a same time. The computation unit 120 may determine the amplitude and phase from a waveform of the time series variation data by Hilbert transform and use the instantaneous value of the amplitude. For example, the computation unit 120 may normalize and then add the amplitudes of the physical amounts at the plurality of positions, the amplitudes being of a same time, and determine whether the vibration mode is occurring in accordance with a total value.

When the amplitudes of the same time in the plurality of time series variation data are added, the total value of the amplitudes is theoretically zero in a higher order ND vibration mode, and theoretically a finite value (non-zero value) in 0ND vibration mode. Note that nodal diameter (ND) refers to the number of node diameters that do not vibrate in the vibration mode.

Figure 4:
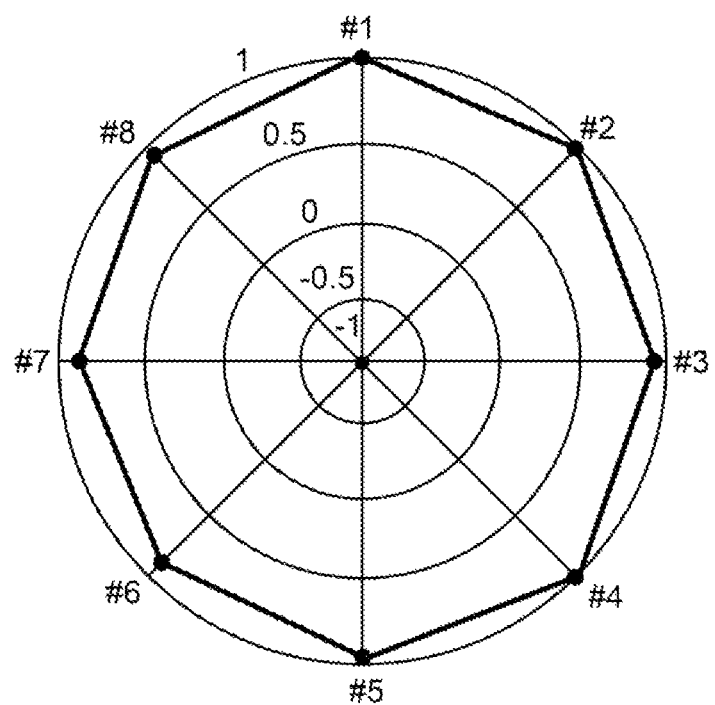
FIG. 4 is a conceptual view for explaining normalized amplitudes of physical amounts at a plurality of positions calculated by the early sign detection device according to an embodiment.

In the gas turbine 20, only the 0ND vibration mode contributes to a sudden variant vibration. FIG. 4 is a conceptual view for explaining the normalized amplitudes of the physical amounts at the plurality of positions calculated by the early sign detection device 300 according to an embodiment. In FIG. 4, plots corresponding to #1 to #8 indicate the respective normalized amplitudes of the eight transition pieces 3 of the combustor 8 of the gas turbine 20 illustrated in FIG. 2. The normalized amplitude indicated by each plot can be a value within a range from 1 to −1. However, in this example, because the same phase and the same amplitude are illustrated, all plots have values close to 1. In this case, the total value of the normalized amplitudes indicated by the plots corresponding to #1 to #8 is not zero.

The computation unit 120 may determine that the vibration mode is occurring when the total value is greater than a first threshold value set in accordance with a number of the plurality of sensors 200. For example, when normalized instantaneous amplitude values are used, a value obtained by multiplying the number of sensors 200 (for example, 8) by a coefficient of 1 or less (for example, 0.5) is set as the first threshold value (for example, 4). The coefficient is of a magnitude that takes into consideration a determination error, and can be changed as appropriate within a range of not less than 0 and not greater than 1. In the example illustrated in FIG. 4, the total value is greater than the first threshold value, and therefore the determination is made that 0ND vibration mode is not occurring.

According to such a determination method, whether 0ND vibration mode is occurring is determined by the total value of the amplitudes, and such a method is suitable when a sudden variant vibration caused by 0ND vibration mode is to be detected. Further, it is possible to easily determine the presence or absence of the occurrence of the vibration mode (0ND vibration mode) by comparison with the first threshold value. Such a determination method is advantageous because it is preferable that an early sign of a sudden variant vibration can be detected quickly. Note that, according to such a determination of the occurrence of the vibration mode by amplitude, the accuracy may be higher than a determination by phase described later.

The computation unit 120 may be configured to search for a peak occurrence time of the amplitude of the time series variation data at any one of the plurality of positions, and determine whether the vibration mode is occurring on the basis of the amplitudes of the physical amounts at the plurality of positions at the peak occurrence time. The peak occurrence time of the amplitude is the time at which the occurrence state of the vibration mode is readily reflected into the vibration. In this regard, in the above-described configuration, in the determination of whether the vibration mode is occurring, the peak occurrence time of the amplitude of the time series variation data at any one position (specific position) of the plurality of positions is used. As a result, the determination accuracy is improved.

The computation unit 120 may be configured to determine whether the vibration mode is occurring at a plurality of timings (for example, 100) within a predetermined time (for example, 1 second), and compute, among the plurality of timings, a proportion of a number of times that the vibration mode is determined to be occurring as the occurrence probability of the vibration mode. According to such a configuration, whether the vibration mode is occurring at the plurality of timings is determined and that is computed as the occurrence probability of the vibration mode, making it possible to improve the accuracy compared to when the occurrence probability of the vibration mode is computed only at a single timing.

Computation Method of Occurrence Probability of Vibration Mode Based on Phase

Hereinafter, the computation method for computing the occurrence probability of the vibration mode on the basis of a phase indicated by the time series variation data of the physical amount will be described. The computation unit 120 determines whether the vibration mode is occurring in accordance with whether the phases of the physical amounts at the plurality of positions are synchronized. The computation unit 120 may determine a phase difference from a waveform of the time series variation data by Hilbert transform. For example, the computation unit 120 may set one of a plurality of the time series variation data acquired from the plurality of sensors 200 as reference data, calculate the phase difference between the phase of the reference data and the phase of each of the other of the plurality of time series variation data, and determine whether the phases are synchronized on the basis of whether the phase differences calculated are within a common phase range or within an opposite phase range.

When evaluating whether the phases are synchronized from the phase difference, a phase synchronization parameter $r_{ij}$ shown in the following formula (1) may be calculated. The phase synchronization parameter $r_{ij}$ is a parameter that can take a value within a range of not less than 0 to not greater than 1. $\theta_i(t)$ is the phase indicated by the reference data, and $\theta_j(t)$ is the phase indicated by time series variation data other than the reference data. The difference between these corresponds to the phase difference.

$$r_{ij} = \left| \lim_{\Delta t \to \infty} \frac{1}{\Delta t} \int e^{j[\theta_i(t) - \theta_j(t)]} dt \right| \quad (1)$$

Figure 5A:
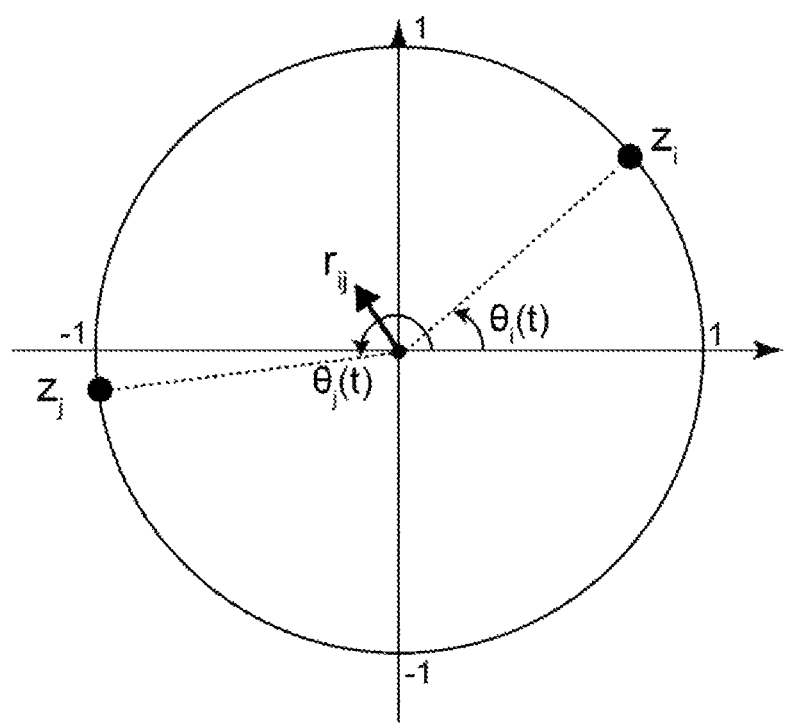
FIG. 5A is a conceptual view for explaining a phase synchronization parameter calculated by the early sign detection device according to an embodiment.

FIG. 5A is a conceptual view for explaining the phase synchronization parameter $r_{ij}$ calculated by the early sign detection device 300 according to an embodiment. The phase synchronization parameter $r_{ij}$ can be found from the relationship between the phase $\theta_i(t)$ and the phase $\theta_j(t)$, as illustrated in FIG. 5A.

In the phase synchronization determination, the phase difference within the common phase range is set to a range corresponding to, for example, within ±10°. The phase difference within the opposite phase range is set to a range corresponding to, for example, within 180±10°. Note that these ranges are wide in consideration of the determination error and can be changed as appropriate. Further, each of these may not be the range of the phase differences itself, but may be a range obtained by converting the range of the phase difference into the above-described phase synchronization parameter.

Figure 5B:
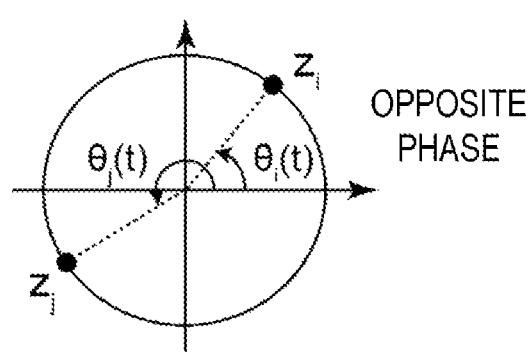
FIG. 5B is a conceptual view illustrating an example in which it is determined that the phases of the physical amounts at two positions are synchronized.
Figure 5C:
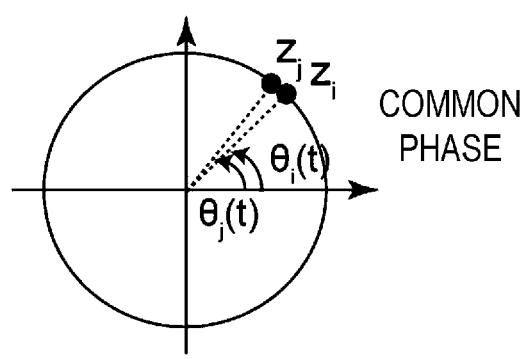
FIG. 5C is a conceptual view illustrating an example in which it is determined that the phases of the physical amounts at two positions are synchronized.

FIG. 5B is a conceptual view illustrating an example in which it is determined that the phases of the physical amounts at two positions are synchronized. FIG. 5C is a conceptual view illustrating an example in which it is determined that the phases of the physical amounts at two positions are synchronized. For example, as illustrated in FIG. 5B, when the phase difference between the phase $\theta_i(t)$ and the phase OM) is within 180±10°, it is determined that the phases are synchronized because the phase difference is within the opposite phase range. For example, as illustrated in FIG. 5C, when the phase difference between the phase $\theta_i(t)$ and the phase OM) is within ±10°, it is determined that the phases are synchronized because the phase difference is within the common phase range.

The computation unit 120 may determine that the vibration mode is occurring when a number of the plurality of time series variation data having the phase difference calculated within the common phase range or within the opposite phase range is greater than a second threshold value set in accordance with the number of the plurality of sensors 200. For example, a value obtained by multiplying the number of sensors 200 (for example, 8) by a coefficient of 1 or less (for example, 0.5) is set as the second threshold value (for example, 4). The coefficient is of a magnitude that takes into consideration a determination error, and can be changed as appropriate within a range of not less than 0 and not greater than 1.

Figure 6A:
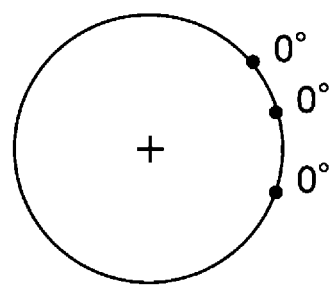
FIG. 6A is a conceptual view for explaining a phase relationship between the plurality of positions when 0ND vibration mode occurs.
Figure 6B:
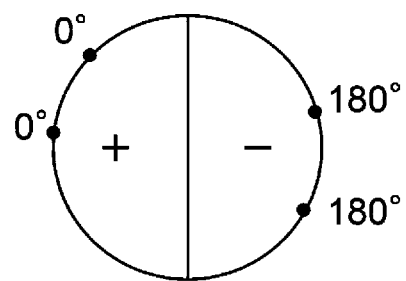
FIG. 6B is a conceptual view for explaining a phase relationship between the plurality of positions when 1ND vibration mode occurs.
Figure 6C:
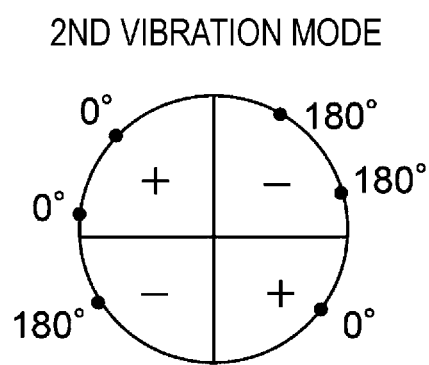
FIG. 6C is a conceptual view for explaining a phase relationship between the plurality of positions when 2ND vibration mode occurs.

FIG. 6A is a conceptual view for explaining a phase relationship between the plurality of positions when 0ND vibration mode occurs. FIG. 6B is a conceptual view for explaining a phase relationship between the plurality of positions when 1ND vibration mode occurs. FIG. 6C is a conceptual view for explaining a phase relationship between the plurality of positions when 2ND vibration mode occurs.

These drawings illustrate the phases of the time series variation data measured by the plurality of sensors 200 arranged in a mode formation cross section of 0ND vibration mode and higher order ND (1ND, 2ND) vibration modes. For example, in FIG. 6A, at any position of the mode formation cross section, the phase of the vibration is 0°. In this case, when the positions are compared, the phase differences are common phases. For example, in FIG. 6B, the phases are split between 0° and 180° on the left and right of the mode formation cross section. In this case, when the positions are compared, the phase differences are common phases or opposite phases, depending on the position. For example, in FIG. 6C, the phases are split between 0° and 180° on the top, bottom, left, and right of the mode formation cross section. In this case, when the positions are compared, the phase differences are common phases or opposite phases, depending on the position.

From these drawings, when the positions are compared regardless of which vibration mode is dominant, the phase differences are common phases or opposite phases. Therefore, it is understood that when the phase difference indicated by the time series variation data of the sensors 200 at different positions is confirmed to be common phase or opposite phase, 0ND or a higher order ND vibration mode is occurring. Note that the same applies to higher order ND vibration modes of 3ND and higher.

Accordingly, according to the determination method of making a determination as described above on the basis of the phases of the physical amounts of the time series variation data, it is possible to detect even a sudden variant vibration caused by either 0ND vibration mode or a higher order Nd vibration mode. That is, because the vibration mode associated with a sudden variant vibration is not limited to the 0ND vibration mode, versatility is improved.

When the vibration mode is occurring, a synchronized state of the phases of the time series variation data of the physical amounts is established, and the phase differences between the phase of certain time series variation data and the phase of the other time series variation data are within the common phase range or within the opposite phase range. Therefore, in the above-described determination method, by focusing on the phase difference, it is possible to easily determine whether the phases are synchronized.

Further, according to the above-described determination method, it is possible to easily determine the presence or absence of occurrence of the vibration mode (0ND vibration mode or a higher order ND vibration mode) by comparison with the second threshold value. Such a configuration is advantageous because it is preferable that an early sign of a sudden variant vibration can be detected quickly.

The computation unit 120 may be configured to determine whether the vibration mode is occurring at a plurality of timings (for example, 100) within a predetermined time (for example, 1 second), and compute, among the plurality of timings, a proportion of a number of times that the vibration mode is determined to be occurring as the occurrence probability of the vibration mode. According to such a configuration, whether the vibration mode is occurring at the plurality of timings is determined and that is computed as the occurrence probability of the vibration mode, making it possible to improve the accuracy compared to when the occurrence probability of the vibration mode is computed only at a single timing.

Note that, as a configuration for computing the occurrence probability of the vibration mode only at a single timing, a configuration is conceivable in which, for example, when the occurrence of the vibration mode is determined on the basis of phase, the occurrence probability of the vibration mode is determined by the percentage of the plurality of time series variation data that are in the common phase or the opposite phase. That is, rather than a comparison with the second threshold value, the computation unit 120 may multiply the value obtained by dividing the number of sensors 200 indicating the time series variation data in the common phase or the opposite phase by a number one less than the number of sensors 200 (that is, the total number excluding the reference data is the denominator) by 100 to calculate the occurrence probability of the vibration mode.

Detection Method of Early Sign of Sudden Variant Vibration

Hereinafter, a detection method of an early sign of a sudden variant vibration will be described. The detection unit 130 may be configured to determine whether there is an early sign of a sudden variant vibration that should be detected on the basis of a magnitude of the occurrence probability of the vibration mode computed by the computation unit 120, for example.

Figure 7:
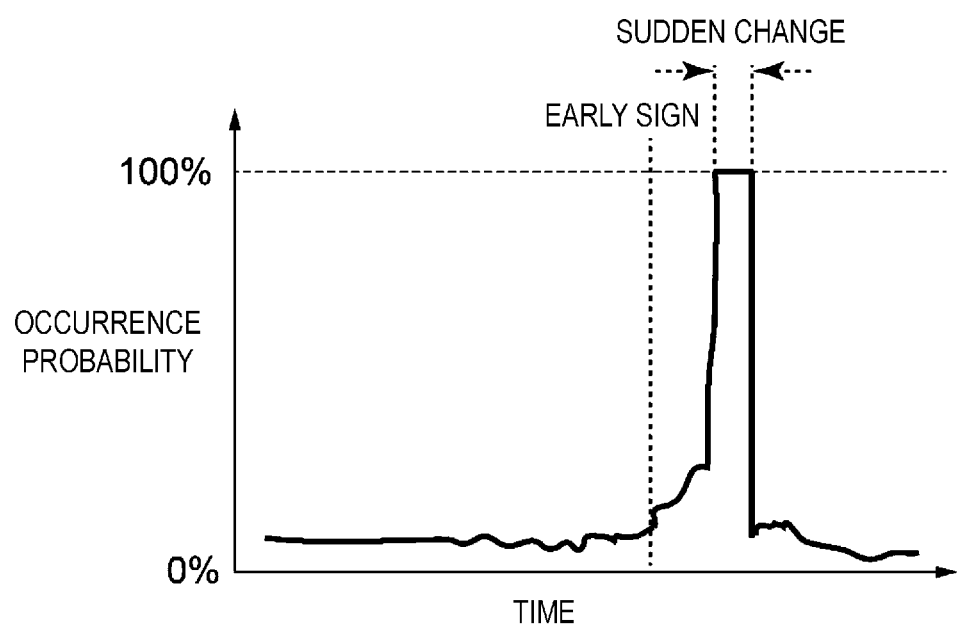
FIG. 7 is a graph illustrating an example of a transition in vibration mode occurrence probability calculated on the basis of the amplitudes of the physical amounts by the early sign detection device according to an embodiment.
Figure 8:
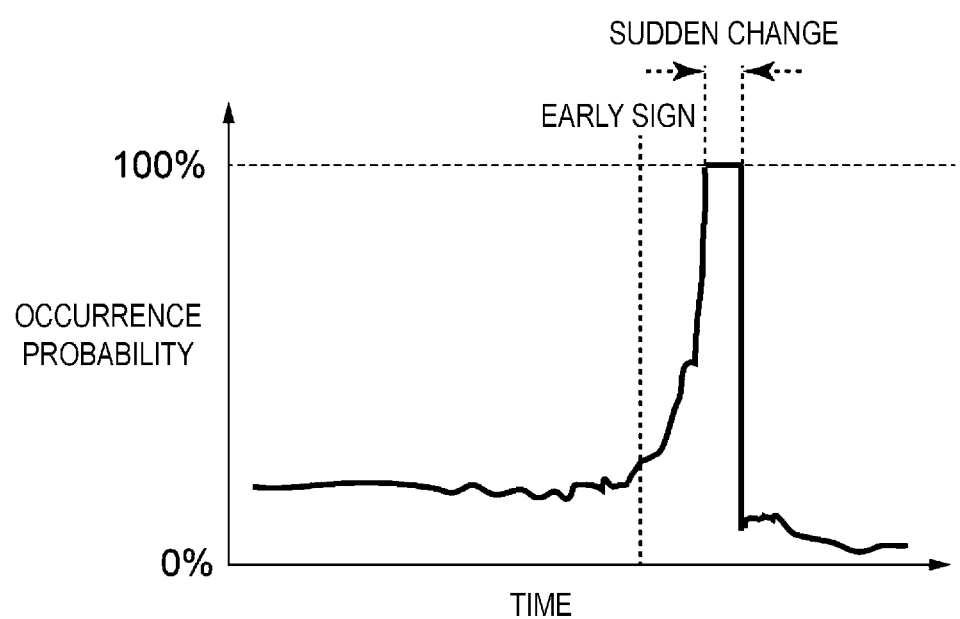
FIG. 8 is a graph illustrating an example of a transition in vibration mode occurrence probability calculated on the basis of the phases of the physical amounts by the early sign detection device according to an embodiment.

FIG. 7 is a graph illustrating an example of a transition in vibration mode occurrence probability calculated on the basis of the amplitude of the physical amount by the early sign detection device 300 according to an embodiment. FIG. 8 is a graph illustrating an example of a transition in vibration mode occurrence probability calculated on the basis of the phase of the physical amount by the early sign detection device 300 according to an embodiment. In these drawings, the horizontal axis indicates the amount of time elapsed, and the vertical axis indicates the magnitude of the occurrence probability of the vibration mode computed by the computation unit 120.

As illustrated in FIG. 7 and FIG. 8, in a state of a sudden variant vibration, the occurrence probability of vibration mode is 100%. In FIG. 7 and FIG. 8, when focusing on the occurrence probability of vibration mode before the early sign, it is understood that the occurrence probability is lower in FIG. 7 than in FIG. 8. This means that the computation method based on amplitude is more accurate than the computation method based on phase.

Here, when the vibration mode occurrence probability is not less than a third threshold value, the detection unit 130 may detect this as an early sign of a sudden variant vibration. For example, when the occurrence probability of the vibration mode during normal operation is about 20%, the third threshold value is set to 40%. Note that the magnitude of the third threshold value can be changed as appropriate in accordance with a detection error.

When the occurrence probability of the vibration mode is high, it is likely that this is an early sign of a sudden variant vibration. In this regard, according to the above-described detection method, by comparing the magnitude of the occurrence probability of the vibration mode to the third threshold value, it is possible to easily detect an early sign of a sudden variant vibration. Such a detection method is advantageous because it is preferable that an early sign of sudden variant vibration can be detected quickly.

The detection unit 130 may be configured to determine whether there is an early sign of a sudden variant vibration that should be detected on the basis of a slope of a temporal change of the occurrence probability of the vibration mode computed by the computation unit 120, for example. When the slope of the temporal change of the occurrence probability of the vibration mode is not less than a fourth threshold value, the detection unit 130 may detect this as an early sign of a sudden variant vibration. For example, when the slope of the temporal change of the occurrence probability of the vibration mode during normal operation is not greater than 5% per second, the fourth threshold value is set to 10%. The time for calculating the slope (that is, the denominator in the slope calculation) is preferably set to a length that is not readily affected by noise, which varies in a short time. Note that the magnitude of the fourth threshold value can be changed as appropriate in accordance with a detection error.

When the occurrence probability of the vibration mode suddenly increases, it is likely that this is an early sign of a sudden variant vibration. In this regard, according to the above-described detection method, by comparing the slope of the temporal change of the occurrence probability of the vibration mode to the fourth threshold value, it is possible to easily detect an early sign of a sudden variant vibration. Such a configuration is advantageous because it is preferable that an early sign of a sudden variant vibration can be detected quickly.

By such a detection method, it is possible to detect a sudden variant vibration well in advance of the occurrence of a sudden variant vibration. For example, as indicated by the dashed lines in FIG. 7 and FIG. 8, an early sign of a sudden variant vibration is detected at the start of the rise in the occurrence probability of the vibration mode before transition to the state of the sudden variant vibration.

Early Sign Detection Method

Figure 9:
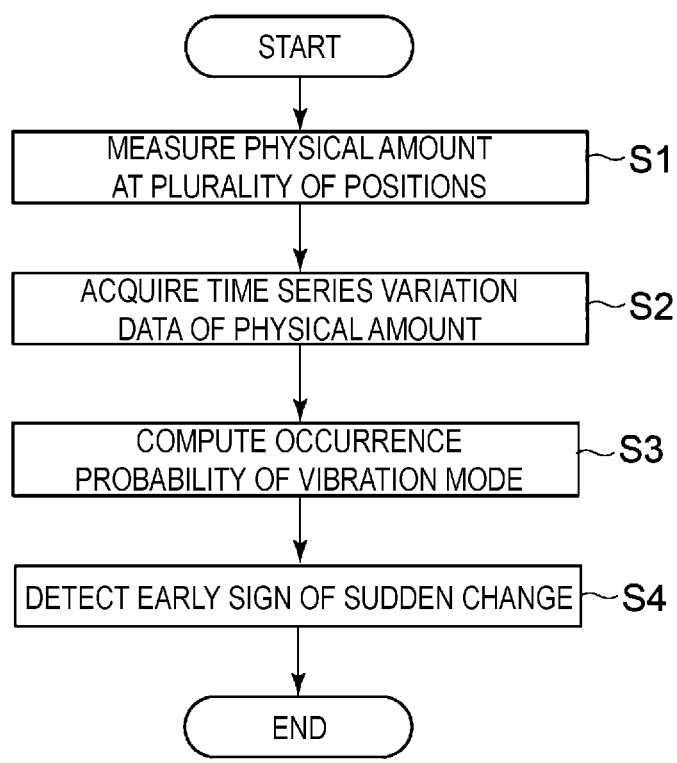
FIG. 9 is a flowchart illustrating procedures of an early sign detection method according to an embodiment.

Hereinafter, a specific example of an early sign detection method will be described with reference to FIG. 9. FIG. 9 is a flowchart illustrating procedures of the early sign detection method according to an embodiment. Note that a portion or all of the procedures described below may be performed manually by the user. Further, in the early sign detection method described below, each procedure can be changed as appropriate so as to correspond to the processing executed by the early sign detection device 300 described above. In the following description, descriptions that overlap with the descriptions of the early sign detection device 300 are omitted.

As illustrated in FIG. 9, first, each of the plurality of sensors 200 respectively disposed at the plurality of positions in the detection subject measure a physical amount at the corresponding position (step S1). From the plurality of sensors 200, the time series variation data of the physical amounts measured by each of the sensors 200 are acquired (step S2). Next, the occurrence probability of the vibration mode involved in a sudden variant vibration of the detection subject is computed (step S3). Specifically, the occurrence probability of the vibration mode is computed from the amplitude or the phase of the time series variation data of the physical amount at each of the plurality of positions. An early sign of the sudden variant vibration is detected on the basis of the occurrence probability computed in step S3 (step S4).

These steps S1 to S4 may be periodically and repeatedly executed. This makes it possible to monitor an early sign of a sudden variant vibration. Note that, when an early sign of a sudden variant vibration is detected, the above-described predetermined signal (a stop signal, a notification signal, or the like) may be outputted.

The disclosure is not limited to the embodiments described above, and also includes a modification of the above-described embodiments as well as appropriate combinations of these modes.

For example, when the detection subject is a compressor, the early sign detection device 300 may be configured to compute the occurrence probability of a surging vibration mode with the plurality of sensors 200 for measuring pressure disposed at a plurality of positions on the compressor. When the detection subject is an axial flow compressor, the early sign detection device 300 may be configured to compute the occurrence probability of the vibration mode with the plurality of sensors 200 disposed in a circumferential direction of an outlet part thereof. When the detection subject is a centrifugal compressor, the plurality of sensors 200 may be disposed in an annular direction. When an early sign of a sudden variant vibration in a blade vibration is to be detected, the plurality of sensors 200 may be disposed in a base of a blade. When an early sign of a sudden variant vibration in an axial vibration is to be detected, the plurality of sensors 200 may be disposed at different bearing positions.

When the detection subject is a steam turbine, a strain gauge may be used as the sensor 200. For example, the plurality of sensors 200 may be disposed in a base of a blade of the steam turbine disposed in the circumferential direction in the same stage.

When the detection subject is a rocket engine, there may only be one combustor. However, in this case as well, the early sign detection device 300 may be configured to detect an early sign of a sudden variant vibration with the plurality of sensors 200 disposed in the circumferential direction of the outlet part of the combustor. When the detection subject is an aircraft, the detection method of an early sign of a sudden variant vibration by the early sign detection device 300 may be applied to the engine or may be applied to the blade. By thus arranging the plurality of sensors 200 in the circumferential direction of a cross section in which the mode is formed, it is possible to detect an early sign of a sudden variant vibration in various detection subjects.

SUMMARY

The contents of the embodiments described above can be construed as follows, for example.

(1) An early sign detection device (300) according to an embodiment of the disclosure includes a plurality of sensors (200) respectively disposed at a plurality of positions of a detection subject and each configured to measure a physical amount at a corresponding position of the plurality of positions, a data acquisition unit (110) configured to acquire time series variation data of the physical amount from each of the plurality of sensors (200), a computation unit (120) configured to compute an occurrence probability of a vibration mode involved in a sudden variant vibration of the detection subject from an amplitude or a phase of the time series variation data of the physical amount at each of the plurality of positions, and a detection unit (130) configured to detect an early sign of the sudden variant vibration on the basis of the occurrence probability.

According to the configuration described in (1) above, time series variation data of a physical amount (for example, a physical amount that changes due to vibration, such as pressure, strain, acceleration, velocity, or displacement) at each of the plurality of different positions are acquired, making it possible to compute the occurrence probability of the vibration mode involved in the sudden variant vibration of the detection subject from a balance relationship between these amplitudes or phases. Further, an early sign of the sudden variant vibration is detected on the basis of the occurrence probability, making it possible to detect a sudden variant vibration well in advance of the occurrence of the sudden variant vibration.

(2) In some embodiments, in the configuration described in (1) above, the computation unit (120) is configured to determine whether the vibration mode is occurring on the basis of the amplitudes of the physical amounts at the plurality of positions, the amplitudes being of a same time.

According to the configuration described in (2) above, whether the vibration mode is occurring is determined on the basis of the amplitudes of the physical amounts at the plurality of positions, the amplitudes being of the same time, thereby improving a determination accuracy of the occurrence of the vibration mode.

(3) In some embodiments, in the configuration described in (1) or (2) above, the computation unit (120) is configured to normalize and then add the amplitudes of the physical amounts at the plurality of positions, the amplitudes being of a same time, and determine whether the vibration mode is occurring in accordance with a total value.

When the amplitudes of the same time in the plurality of time series variation data are added, the total value of the amplitudes is theoretically zero in a higher order ND vibration mode, and theoretically a finite value in 0ND vibration mode. Therefore, according to the configuration described in (3) above, whether 0ND vibration mode is occurring is determined by the total value of the amplitudes, and such a configuration is suitable when a sudden variant vibration caused by 0ND vibration mode is to be detected. Note that, according to such a determination of the occurrence of the vibration mode by amplitude, the accuracy may be higher than a determination by phase.

(4) In some embodiments, in the configuration described in (2) or (3) above, the computation unit (120) is configured to determine that the vibration mode is occurring when the total value is greater than a first threshold value set in accordance with a number of the plurality of sensors.

According to the configuration described in (4) above, it is possible to easily determine the presence or absence of the occurrence of the vibration mode (0ND vibration mode) by comparison with the first threshold value. Such a configuration is advantageous because it is preferable that an early sign of a sudden variant vibration can be detected quickly.

(5) In some embodiments, in the configuration described in any one of (1) to (4) above, the computation unit (120) is configured to search for a peak occurrence time of the amplitude of the time series variation data at any one of the plurality of positions, and determine whether the vibration mode is occurring on the basis of the amplitudes of the physical amounts at the plurality of positions at the peak occurrence time.

The peak occurrence time of the amplitude is the time at which the occurrence state of the vibration mode is readily reflected into the vibration. In this regard, in the configuration described in (5) above, in the determination of whether the vibration mode is occurring, the peak occurrence time of the amplitude of the time series variation data at any one position (specific position) of the plurality of positions is used. As a result, the determination accuracy is improved.

(6) In some embodiments, in the configuration described in any one of (1) to (5) above, the computation unit (120) is configured to determine whether the vibration mode is occurring in accordance with whether the phases of the physical amounts at the plurality of positions are synchronized.

According to the configuration described in (6) above, it is possible to detect even a sudden variant vibration caused by either the 0ND vibration mode or a higher order Nd vibration mode. That is, because the vibration mode associated with a sudden variant vibration is not limited to the 0ND vibration mode, versatility is improved.

(7) In some embodiments, in the configuration described in (6) above, the computation unit (120) is configured to set one of a plurality of the time series variation data acquired from the plurality of sensors (200) as reference data, calculate a phase difference between the phase of the reference data and the phase of each of the other of the plurality of time series variation data, and determine whether the phases are synchronized on the basis of whether the phase difference thus calculated is within a common phase range or within an opposite phase range.

When the vibration mode is occurring, a synchronized state of the phases of the time series variation data of the physical amounts is established, and the phase differences between the phase of certain time series variation data and the phase of the other time series variation data are within the common phase range or within the opposite phase range. In the configuration described in (7) above, by focusing on the phase difference, it is possible to easily determine whether the phases are synchronized.

(8) In some embodiments, in the configuration described in (7) above, the computation unit (120) is configured to determine that the vibration mode is occurring when a number of the plurality of time series variation data having the phase difference thus calculated within the common phase range or within the opposite phase range is greater than a second threshold value set in accordance with the number of the plurality of sensors (200).

According to the configuration described in (8) above, it is possible to easily determine the presence or absence of the occurrence of the vibration mode (0ND vibration mode or higher order ND vibration mode) by comparison with the second threshold value. Such a configuration is advantageous because it is preferable that an early sign of a sudden variant vibration can be detected quickly.

(9) In some embodiments, in the configuration described in any one of (1) to (8) above, the computation unit (120) is configured to determine whether the vibration mode is occurring at a plurality of timings within a predetermined time, and compute, among the plurality of timings, a proportion of a number of times that the vibration mode is determined to be occurring as the occurrence probability of the vibration mode.

According to the configuration described in (9) above, whether the vibration mode is occurring at the plurality of timings is determined and that is computed as the occurrence probability of the vibration mode, making it possible to improve the accuracy compared to when the occurrence probability of the vibration mode is computed only at a single timing.

(10) In some embodiments, in the configuration described in any one of (1) to (9) above, the detection unit (130) is configured to detect an early sign of the sudden variant vibration when a magnitude of the occurrence probability of the vibration mode thus computed by the computation unit (120) is not less than a third threshold value.

When the occurrence probability of the vibration mode is high, it is likely that this is an early sign of a sudden variant vibration. In this regard, according to the configuration described in (10) above, by comparing the magnitude of the occurrence probability of the vibration mode to the third threshold value, it is possible to easily detect an early sign of a sudden variant vibration. Such a configuration is advantageous because it is preferable that an early sign of a sudden variant vibration can be detected quickly.

(11) In some embodiments, in the configuration described in any one of (1) to (10) above, the detection unit (130) is configured to detect an early sign of the sudden variant vibration when a slope of a temporal change of the occurrence probability of the vibration mode thus computed by the computation unit (120) is not less than a fourth threshold value.

When the occurrence probability of the vibration mode suddenly increases, it is likely that this is an early sign of a sudden variant vibration. In this regard, according to the configuration described in (11) above, by comparing the slope of the temporal change of the occurrence probability of the vibration mode to the fourth threshold value, it is possible to easily detect an early sign of a sudden variant vibration. Such a configuration is advantageous because it is preferable that an early sign of a sudden variant vibration can be detected quickly.

(12) In some embodiments, in the configuration described in any one of (1) to (11) above, the physical amount is one or more of pressure, strain, acceleration, velocity, and displacement.

According to the configuration described in (12) above, a physical amount highly relevant to the occurrence of the vibration mode is used for early sign detection, and therefore the detection accuracy is high.

(13) An early sign detection method according to an embodiment of the disclosure includes measuring, by each of a plurality of sensors (200) respectively disposed at a plurality of positions of a detection subject, a physical amount at a corresponding position of the plurality of positions, acquiring time series variation data of the physical amount from each of the plurality of sensors (200), computing an occurrence probability of a vibration mode involved in a sudden variant vibration of the detection subject from an amplitude or a phase of the time series variation data of the physical amount at each of the plurality of positions, and detecting an early sign of the sudden variant vibration on the basis of the occurrence probability.

According to the method described in (13) above, time series variation data of a physical amount (for example, a physical amount that changes due to vibration, such as pressure, strain, acceleration, velocity, or displacement) at each of the plurality of different positions are acquired, making it possible to compute the occurrence probability of the vibration mode involved in the sudden variant vibration of the detection subject from a balance relationship between these amplitudes or phases. Further, an early sign of the sudden variant vibration is detected on the basis of the occurrence probability, making it possible to detect a sudden variant vibration well in advance of the occurrence of the sudden variant vibration.

While preferred embodiments of the invention have been described as above, it is to be understood that variations and modifications will be apparent to those skilled in the art without departing from the scope and spirit of the invention.

The scope of the invention, therefore, is to be determined solely by the following claims.

The invention claimed is:

1. An early sign detection device comprising:
   a plurality of sensors respectively disposed at a plurality of positions of a detection subject, the plurality of sensors each being configured to measure a physical amount at a corresponding position of the plurality of positions; and
   a processor configured to perform:
      acquiring time series variation data of the physical amount from each of the plurality of sensors;
      computing an occurrence probability of a vibration mode involved in a sudden variant vibration of the detection subject from a phase of the time series variation data of the physical amount at each of the plurality of positions;
      detecting an early sign of the sudden variant vibration on the basis of the occurrence probability; and
      when the early sign of the sudden variant vibration is detected, outputting a predetermined signal effective for avoiding the sudden variant vibration,
   wherein the computing the occurrence probability of the vibration mode includes:
      determining whether the vibration mode is occurring in accordance with whether the phases of the physical amounts at the plurality of positions are synchronized;
      setting one of a plurality of the time series variation data acquired from the plurality of sensors as reference data;
      calculating a phase difference between the phase of the reference data and the phase of each of the other of the plurality of time series variation data;
      determining whether the phases are synchronized on the basis of whether the phase difference thus calculated is within a common phase range or within an opposite phase range; and
      determining, as the occurrence probability, that the vibration mode is occurring when a number of the plurality of time series variation data having the phase difference thus calculated within the common phase range or within the opposite phase range is greater than a threshold value set in accordance with the number of the plurality of sensors.

2. The early sign detection device according to claim 1, wherein
   the physical amount is one or more of pressure, strain, acceleration, velocity, and displacement.

3. The early sign detection device according to claim 1, wherein
   the predetermined signal is one of a stop signal for stopping operation of the detection subject and an output control signal for reducing an output of the detection subject.

4. An early sign detection method comprising:
   measuring, by each of a plurality of sensors respectively disposed at a plurality of positions of a detection subject, a physical amount at a corresponding position of the plurality of positions;
   acquiring time series variation data of the physical amount from each of the plurality of sensors;
   computing an occurrence probability of a vibration mode involved in a sudden variant vibration of the detection subject from a phase of the time series variation data of the physical amount at each of the plurality of positions; and
   detecting an early sign of the sudden variant vibration on the basis of the occurrence probability; and
   when the early sign of the sudden variant vibration is detected, outputting a predetermined signal effective for avoiding the sudden variant vibration,
   wherein the computing the occurrence probability of the vibration mode includes:
      determining whether the vibration mode is occurring in accordance with whether the phases of the physical amounts at the plurality of positions are synchronized;
      setting one of a plurality of the time series variation data acquired from the plurality of sensors as reference data;
      calculating a phase difference between the phase of the reference data and the phase of each of the other of the plurality of time series variation data;
      determining whether the phases are synchronized on the basis of whether the phase difference thus calculated is within a common phase range or within an opposite phase range; and
      determining, as the occurrence probability, that the vibration mode is occurring when a number of the plurality of time series variation data having the phase difference thus calculated within the common phase range or within the opposite phase range is greater than a threshold value set in accordance with the number of the plurality of sensors.

5. The early sign detection method according to claim 4, wherein
   the physical amount is one or more of pressure, strain, acceleration, velocity, and displacement.

6. The early sign detection method according to claim 4, wherein
   the predetermined signal is one of a stop signal for stopping operation of the detection subject and an output control signal for reducing an output of the detection subject.

* * * * *